June 25, 1957  M. B. CONRAD  2,797,109
THREADED JOINT AND LOCK
Filed Aug. 16, 1954

INVENTOR.
MARTIN B. CONRAD
BY
Mellin and Hanscom
ATTORNEYS

United States Patent Office 2,797,109
Patented June 25, 1957

2,797,109

THREADED JOINT AND LOCK

Martin B. Conrad, Downey, Calif., assignor to Baker Oil Tools, Inc., Los Angeles, Calif., a corporation of California Application August 16, 1954, Serial No. 449,928

6 Claims. (Cl. 285—81)

The present invention relates to devices for preventing inadvertent unthreading between members which are threadedly secured to one another, and, in general, it relates to devices for preventing relative rotation between adjacent members.

Oil, gas, water and sulphur well casing is ordinarily composed of a plurality of sections threadedly connected to each other, either directly or through the medium of an intervening coupling or collar. A shoe may also be threadedly attached to the lower end of the string of casing. Inadvertent unscrewing of the shoe and some of the couplings, collars and casing sections has been prevented heretofore by welding the various parts together after the threaded joints have been tightened. Certain steels of which the casing and its associated fittings are made do not lend themselves to proper welding. Under certain circumstances, the heat associated with the welding operation may reduce the strength of the parts and also effect their distortion. Moreover, the necessity for welding the joints together is a time consuming and costly operation.

Accordingly, it is an object of the present invention to provide an improved lock which avoids the aforenoted disadvantages by preventing unthreading between companion threaded members without the necessity for welding the members together.

Another object of the invention is to provide an improved lock for preventing unthreading between companion threaded members, the lock being easy to insert in place after the members have been tightly secured to each other and which will not distort the members even when subjected to relatively high loads.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention, but it is to be understood that such detailed description is not to be taken in a limiting sense, since the scope of the invention is best defined by the appended claims.

Referring to the drawings.

Figure 1:
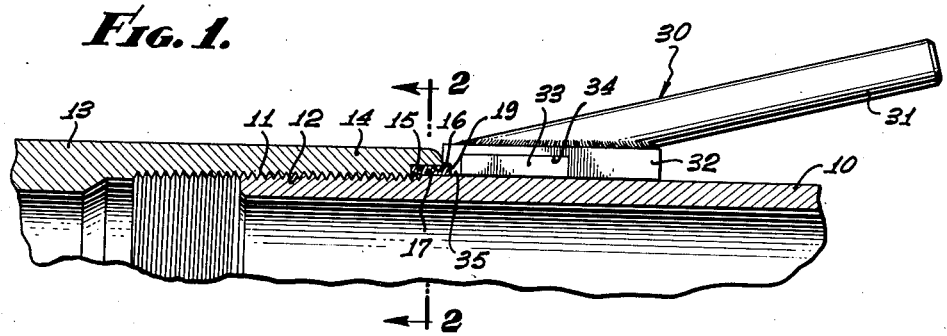
Figure 1 is a fragmentary longitudinal section through a threaded joint disclosing the thread lock inserted in place.
Figure 2:
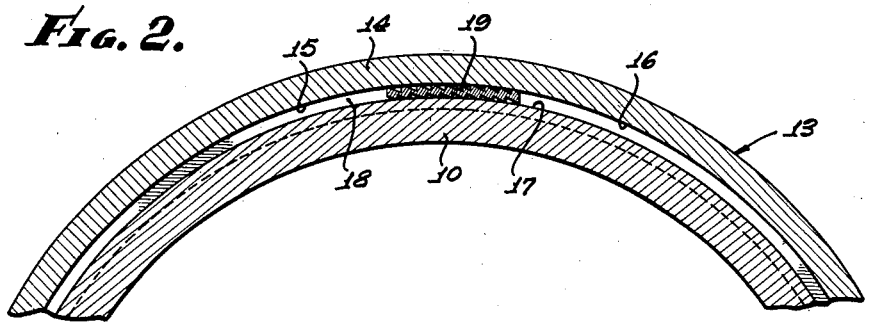
Fig. 2 is an enlarged section taken along the line 2—2 on Fig. 1.

As shown in the drawings, a tubular member 10 may have an end portion provided with external threads 11 threadedly secured to companion internal threads 12 formed in another adjacent tubular member 13. As shown, a tapered threaded joint is provided, the male threaded member 11 being tightened to the desired degree within the female threaded member 12. The female thread may be provided in the box portion 14 of the casing shoe, or in a coupling or collar for connecting casing sections together. The female threads may also be provided in the box portion of another casing section 13 adjacent the casing section 13 on which the male threads are formed.

It is desired to tighten the threaded joint to the extent deemed necessary and to prevent loosening of the joint without the necessity for welding the tubular members 10, 13 to one another. To accomplish this purpose, the box portion 14 of the tubular member has a counterbore 15 at its outer end that may be of relatively short length. The inner wall 16 of this counterbore is coaxial with the opposed external peripheral surface 17 of the casing section 10 containing the male thread, there being an annular space 18 of uniform radial extent disposed completely around the circumference of the members.

One or more locking members 19 are inserted into the counterbore 15. When a plurality of locking members 19 is used, they may be appropriately circumferentially spaced from each other. Each locking member is arcuate and is of a radial thickness substantially equal to the radial distance between the periphery 17 and the inner tubular member 10 and the inner wall 16 of the counterbore 15. Preferably, the locking member 19 is of a slightly greater thickness than the radial distance across the annulus 18 between the periphery of the inner member and the wall of the counterbore formed in the outer tubular member 13.

Figure 3:
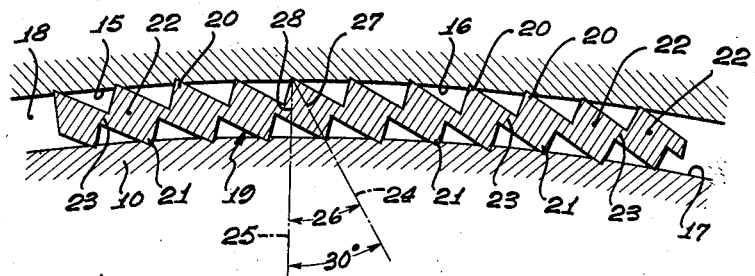
Fig. 3 is a further enlargement of the lock portion of the device, disclosing it in the position prior to its effectively locking the threaded members together.
Figure 4:
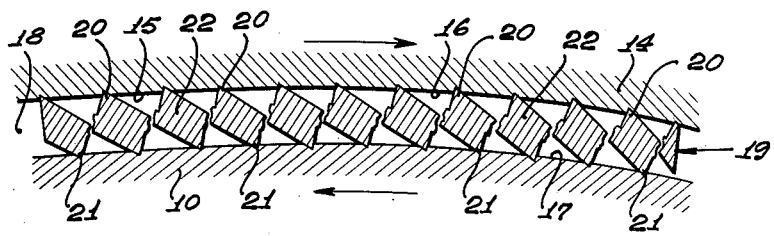
Fig. 4 is a view similar to Fig. 3, disclosing the lock elements after having locked the threaded members to each other.

Each locking member 19 is provided with a plurality of longitudinally extending outer teeth 20 and with a companion number of longitudinally extending inner teeth 21. There is one longitudinal outer tooth 20 and one longitudinal inner tooth 21 provided on each tooth portion 22 of the locking member, the tooth edges being relatively sharp for penetration into the wall 16 of the counterbore and the periphery 17 of the tubular member. The tooth portions 22 are connected to one another by intervening relatively weakened sections 23 of the locking member, the outer tooth 20 of each tooth portion 22 being disposed circumferentially in advance of the inner tooth 21 of the same tooth portion in the direction in which the inner member 10 is rotated when it tends to be unthreaded from the outer mmber 13 containing the female thread 12. As disclosed most clearly in Fig. 3, a line 24 drawn from the outer tooth edge 20 of a particular tooth portion 22 to the inner tooth edge 21 of the same tooth portion would lie rearwardly of a radial line 25 drawn from the outer edge 20 of the tooth portion to the axis of the tubular members, this rearward direction being related to the direction in which the inner tubular member 10 must turn in being unthreaded from the companion outer tubular member 13. The angle 26 between the radial line 25 and the line 24 drawn through the outer and inner edges 20, 21 of a tooth portion 22 can theoretically be any value greater than zero and less than ninety degrees. As an example, the angle may be of the order of thirty degrees, although other angles can be used and will be effective in providing a proper lock member 19.

It is evident that the distance 27 between the outer and inner tooth edges 20, 21, measured along the line 24, is substantialy greater than the radial distance 28 between the wall 16 of the counterbore 15 and the outer periphery 17 of the inner member 10. Accordingly, assuming that the inner member 10 has been threaded into the outer member 13 and has been tightened with respect thereto, and that the lock member 19 has been inserted in place in the counterbore 15 the inner and outer edges 21, 20 are engaging the periphery 17 of the inner member and the wall 16 of the counterbore to some extent. Any tendency for either the inner member 10 or the outer member 13 to turn in an unthreading direction with respect to each other will cause the sharp teeth 20, 21 to dig into the inner and outer members, which digging action is increased, inasmuch as the inner teeth 21 will tend to move in the same direction that the inner member 10 is tending to move, and the outer teeth 20 are tending to be moved relatively in the opposite direction by the outer member 13. Since the inner and outer teeth 21, 20 of each tooth portion 22 lies on a plane 24 that is inclined to a radial plane 25 the tendency for the tubular members to unthread from each other will straighten up or shift the inclined planes 24 toward a position that is radial of the casing sections. This shifting tendency will cause the teeth 21, 20 to dig to a greater extent into the periphery 17 of the inner member and the wall 16 of the counterbore, in view of the fact that the distance 27 between the inner and outer teeth of each portion is greater than the radial distance 28 across the annular space 18 between the inner member 10 and the wall 16 of the counterbore 15. As a matter of fact, if sufficient force is exerted tending to loosen the members with respect to each other, the locking member 19 will break at its weakened sections 23 between adjoining tooth portions 22, providing separated tooth portions 22 that will rock upon their outer and inner sharp teeth 20, 21, the teeth of each portion tending to move in opposite directions and digging more firmly into the inner and outer members. The extent that the tubular members 10, 13 can move arcuately with respect to each other is very small, since the unthreading relative arcuate movement is prevented to any noticeable extent by the embedding action of the inner and outer teeth 21, 20 of each portion 22 into the periphery 17 of the inner member and the wall 16 of the counterbore formed in the outer tubular member.

The specific form of invention disclosed in the drawing is for a right-hand threaded connection. Accordingly, the inner edge 21 of each tooth portion 22 is displaced arcuately to the right when compared to the outer edge 20 of the same tooth portion. Any tendency for the tubular members to be unthreaded will tend to shift the outer edge 20 relatively to the right and the inner edge 21 relatively to the left, causing the line 24 drawn through the tooth edges to move closer to the radial line 25, and, in so doing, will cause the inner and outer teeth 21, 20 to dig to a greater extent into the members 10, 13, in view of the fact that the distance 27 between the inner and outer teeth of the same portion 22 is substantially greater than the radial gap 28 between the periphery 17 of the member 10 and the counterbore wall 16. Of course, if the threaded connection were a left-hand one, then the inner sharp edge 21 of each tooth portion 22 would be disposed to the left of the outer sharp edge 20 of the same tooth portion 22, as seen in the drawings.

In one design of a lock member, it has been made from mild steel that has been carburized, to harden the external surfaces and particularly the longitudinally extending inner and outer teeth 21, 20. Each tooth is made with an angle of substantially ninety degrees between its opposite faces, although, of course, still smaller angles would cause the teeth to embed more readily into the counterbore wall 16 and the exterior 17 of the inner tubular member 10. With the specific device illustrated in the drawings, it has been found that the lock is highly effective in preventing unthreading between the inner and outer tubular members and without distorting the tubular members. One or more locking members 19 can be inserted in place, depending upon the torques to which the tubular members might be subjected. If a heavy load is encountered, then a sufficient number of locking members will be placed in the annular space between the counterbore walls and the periphery of the inner member to divide the load around the circumference of the annular space and insure against loosening of the threaded joint, as well as against distortion of the parts due to the wedging action of the tooth portions 22 between the counterbore wall 16 and the periphery 17 of the inner member.

Each locking member is easily inserted in place. The tool 30 disclosed in Fig. 1 may be used. This tool includes a handle 31 having a metallic body 32 secured to its inner end, this body carrying a permanent magnet 33 within its lower socket 34, the forward end of the magnet being disposed adjacent a relatively short wall 35 engageable with the outer end of the lock member 19. The magnet 33 will hold the lock member 19 in appropriate position against the forward wall 35 of the body 32 by virtue of magnetic attraction, allowing the lock member 19 to be inserted in the counterbore 15 and driven in place, as by striking the end of the handle 31 with a hammer, or the like. The outer and inner teeth 20, 21 will dig into the exterior 17 of the inner member 10 and the counterbore wall 16 when the latch member is disposed to the required extent within the counter bore 15. Since permanent magnets are usually made of relatively brittle material, the hammer blows will be transmitted to the locking member 19 through the forward wall 35 of the body 32, thereby relieving the magnet 33 of the necessity for transmitting such impact blows. Once the lock member 19 is disposed in place, the inserting tool 30 is removed.

The inventor claims:

1. In a threaded joint: a male member having an external thread received within an internal thread of a female member; said female member having a counterbore longitudinally to one side of its internal thread, said counterbore having an inner wall surrounding and spaced from the periphery of said male member to provide an annular space therebetween; a lock member in said annular space including a plurality of circumferentially adjacent toothed portions, each portion having a sharp longitudinal outer tooth engaging said inner wall and a sharp longitudinal inner tooth engaging said periphery of said male member, a straight line drawn between the point of engagement of said outer tooth with said inner wall and the point of engagement of said inner tooth with said male member periphery making an acute angle with a line radial of said members drawn to said point of engagement of said outer tooth with said inner wall; said straight line drawn between said inner and outer teeth lying rearwardly of said radial line with respect to turning of said male member in an unthreading direction; the over-all radial thickness of said lock member being substantially equal to, but not less than, the radial distance between the periphery of said male member and the surrounding inner wall of said counterbore; said lock member further including breakable sections interconnecting said portions, said sections breaking upon said male and female members tending to unthread from each other to disconnect said portions from each other and permit each portion to rock about the points of engagement with said inner wall and male member periphery toward a position reducing the aforesaid acute angle that said straight line makes with said radial line, whereby said inner and outer teeth are embedded to a greater extent into said inner wall and male member periphery.

2. In a threaded joint: a male member having an external thread received within an internal thread of a female member; said female member having a counterbore longitudinally to one side of its internal thread, said counterbore having an inner wall surrounding and spaced from the periphery of said male member to provide an annular spaced therebetween; a lock member in said annular space including a plurality of circumferentially adjacent toothed portions of parallelogram cross-section, each portion having a sharp longitudinal outer tooth engaging said inner wall and a sharp longitudinal inner tooth engaging said periphery of said male member, a straight line drawn between the point of engagement of said outer tooth with said inner wall and the point of engagement of said inner tooth with said male member periphery making an acute angle with a line radial of said members drawn to said point of engagement of said outer tooth with said inner wall; said straight line drawn between said inner and outer teeth lying rearwardly of said radial line with respect to turning of said male member in an unthreading direction; the over-all radial thickness of said lock member being substantially equal to, but not less than, the radial distance between the periphery of said male member and the surrounding inner wall of said counterbore; said lock member further including breakable sections interconnecting said portions, said sections each having a thin cross-section to break upon said male and female members tending to unthread from each other to disconnect said portions from each other and permit each portion to rock about the points of engagement with said inner wall and male member periphery toward a position reducing the aforesaid acute angle that said straight line makes with said radial line, whereby said inner and outer teeth are embedded to a greater extent into said inner wall and male member periphery.

3. In a threaded joint: a male member having an external thread received within an internal thread of a female member; said female member having a counterbore longitudinally to one side of its internal thread, said counterbore having an inner wall surrounding and spaced from the periphery of said male member to provide an annular space therebetween; a lock member in said annular space including a plurality of circumferentially adjacent toothed portions of parallelogram cross-section having inner and outer parallel transverse sides and inner and outer parallel lateral sides intersecting said transverse sides to provide a sharp longitudinal inner tooth engaging said periphery of said male member and a sharp longitudinal outer tooth engaging said inner wall, a straight line drawn between the point of engagement of said outer tooth with said inner wall and the point of engagement of said inner tooth with said male member periphery making an acute angle with a line radial of said members drawn to said point of engagement of said outer tooth with said inner wall; said straight line drawn between said inner and outer teeth lying rearwardly of said radial line with respect to turning of said male member in an unthreading direction; the over-all radial thickness of said lock member being substantially equal to, but not less than, the radial distance between the periphery of said male member and the surrounding inner wall of said counterbore; said lock member further including breakable sections interconnecting said portions, each of said breakable sections being provided by a continuation of said inner transverse side of one portion and an outer transverse side of an adjacent portion; each of said sections having a thin cross-section in a direction laterally of said said member at which each section can break upon said male and female members tending to unthread from each other to disconnect said portions from each other and permit each portion to rock about the points of engagement with said inner wall and male member periphery toward a position reducing the aforesaid acute angle that said straight line makes with said radial line, whereby said inner and outer teeth are embedded to a greater extent into said inner wall and male member periphery.

4. In a threaded joint: a male member having an external thread received within an internal thread of a female member; said female member having a counterbore longitudinally to one side of its internal thread, said counterbore having an inner wall surrounding and spaced from the periphery of said male member to provide an annular space therebetween; a lock member in said annular space including a plurality of circumferentially adjacent tooth portions, each of said tooth portions being of parallelogram cross-section of uniform thickness throughout its length to provide a longitudinal outer tooth having a sharp longitudinal outermost edge engaging said inner wall and a longitudinal inner tooth having a sharp longitudinal innermost edge engaging said periphery of said male member, a straight line drawn between the point of engagement of said outer tooth edge with said inner wall and the point of engagement of said inner tooth edge with said male member periphery making an acute angle with a line radial of said members drawn to said point of engagement of said outer tooth edge with said inner wall; said straight line drawn between said inner and outer teeth edges lying rearwardly of said radial line with respect to turning of said male member in an unthreading direction; the over-all radial thickness of said lock member being slightly greater than the radial distance between the periphery of said male member and the surrounding inner wall of said counterbore; and means joining adjacent parallelogram tooth portions to provide a cross-section between said adjacent teeth reduced with respect to the cross-section of each of said adjacent tooth portions, whereby each tooth portion is permitted to rock with respect to its adjacent tooth portion about the points of engagement of said edges with said inner wall and male member periphery toward a position reducing the aforesaid acute angle that said straight line makes with said radial line, whereby said inner and outer teeth edges are embedded to a great extent into said inner wall and male member periphery.

5. In a threaded joint as defined in claim 4, wherein said means joining adjacent tooth portions is releasable.

6. In a threaded joint as defined in claim 4 wherein said means joining adjacent tooth portions includes opposite sides of adjacent tooth portions which are extended in opposite directions to form a reduced cross-sectional area.

References Cited in the file of this patent
UNITED STATES PATENTS

| | | |
|---|---|---|
| 2,318,590 | Boynton | May 11, 1943 |
| 2,638,368 | Weinberg | May 12, 1953 |